(No Model.) 2 Sheets—Sheet 2.
E. FRENCH & F. PARVIN.
SULKY HARROW.
No. 315,492. Patented Apr. 14, 1885.
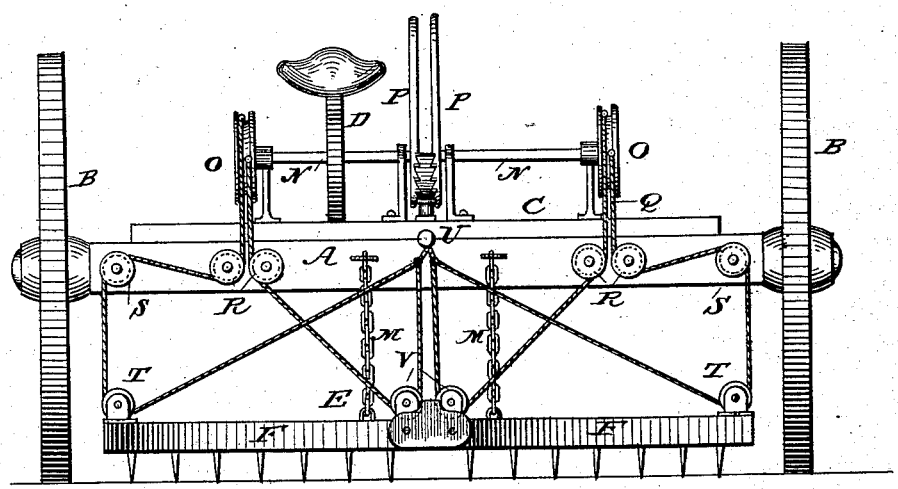
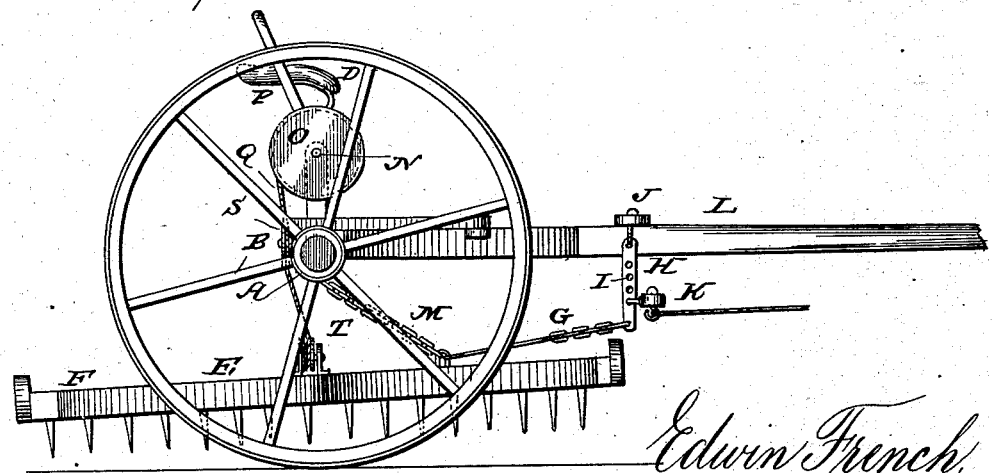
WITNESSES:
INVENTORS
Edwin French
Frank Parvin
By Louis Bagger & Co.
ATTORNEYS

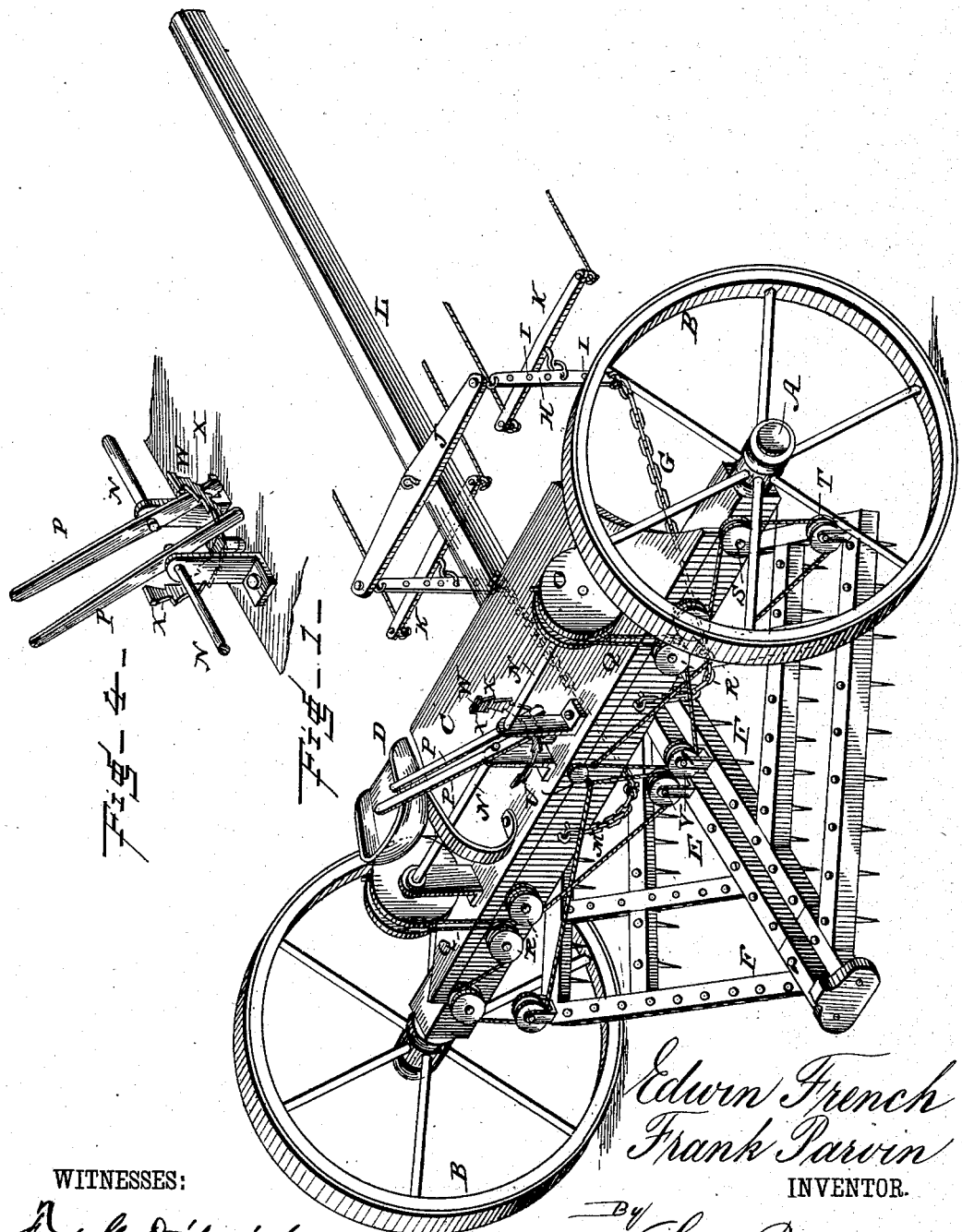

UNITED STATES PATENT OFFICE.

EDWIN FRENCH AND FRANK PARVIN, OF EMPORIA, KANSAS; SAID PARVIN ASSIGNOR TO ARMELDER F. PACK, OF SAME PLACE.

SULKY-HARROW.

SPECIFICATION forming part of Letters Patent No. 315,492, dated April 14, 1885.

Application filed April 5, 1884. (No model.)

*To all whom it may concern:*

Be it known that we, EDWIN FRENCH and FRANK PARVIN, of Emporia, in the county of Lyon and State of Kansas, have invented certain new and useful Improvements in Sulky-Harrows; and we do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of our improved wheel-harrow. Fig. 2 is a rear view of the same. Fig. 3 is a side view showing the harrow raised from the ground, and Fig. 4 is a perspective detail view of the notched segment and the raising-levers.

Similar letters of reference indicate corresponding parts in all the figures.

Our invention has relation to wheel or so-called "sulky" harrows; and it consists in the improved construction and combination of parts of the same, as hereinafter more fully described and claimed.

In the accompanying drawings, the letter A indicates the axle, upon the ends of which the wheels B B turn, and upon the upper side of which is secured the platform C, carrying the seat D for the driver.

E is the harrow, which is preferably composed of two triangular halves, F F, hinged with their bases together, and two draft-chains, G G, are secured to the forward portions of the two frames, and at their forward ends to two bars, H, having a number of perforations, I, and pending from the ends of a double-tree, J, the single-trees K being attached in the perforations in the pending bars, and the double-tree being pivoted upon the tongue L, projecting forward from the axle.

Two chains, M M, are attached at their lower ends to the forward portions of the harrow-frames and at their upper ends to the axle, in such a manner that when the harrow is raised the draft upon the harrow from the draft-chains will not fall upon the ropes or chains serving to raise the harrow, but will fall upon these chains, while when the harrow is lowered the draft will be directly upon the harrow.

Two shafts, N N, turn in transverse bearings upon the upper side of the platform, and are provided at their outer ends with grooved pulleys or disks O O, and at their inner ends with levers P P, and two pairs of ropes or chains, Q Q, are secured to the grooved peripheries of these pulleys, pass between pulleys R R, secured in pairs upon the rear side of the axle, under each grooved pulley, whereupon they diverge, the outer ropes passing over pulleys S S near the ends of the axle, thereupon under pulleys T T at the apices of the triangular harrow-frames, and up to a lug, U, upon the middle of the rear side of the axle, where they are connected to the inner ropes, which pass down through pulleys V V upon the inner meeting edges of the triangular harrow-frames, and up to the central lug upon the axle.

The levers upon the inner ends of the shafts upon the platform are secured upon the said ends a distance from one end, forming a short and a long arm, and an inverted segmental flat bar, W, is secured between the two levers, having notches X in its edges, of the shape of ratchet-teeth, into which notches the ends of the short arms of the levers engage, the notches preventing the levers from being pulled rearward by the weight of the harrow-frames upon the ropes or chains tending to turn the pulleys and the shafts, the levers only tilting rearward when their longer arms are forced toward each other, which disengages the shorter arms from the notches.

It will thus be seen that the harrows may be raised or lowered at will by tilting the levers forward, and that the draft upon the harrow, when it is raised, will be borne by the chains attached to the axle, and not fall upon the ropes or chains serving to raise the harrows.

Having thus described our invention, we claim and desire to secure by Letters Patent of the United States—

The combination of the axle mounted upon wheels, and having the pulleys S S pivoted near its ends, and the pulleys R R pivoted in pairs about midway between the middle and the ends of the axle, the triangular harrows hinged together at their adjoining bases, and provided with the pulleys T T at their apices and pulleys V V at their bases, the pulleys O O, having means for turning them, substantially as set forth, and the two pairs of ropes or chains secured to the pulleys O O, passing between the pulleys R, the outer ropes passing over pulleys S and under pulleys T, and secured to the middle of the axle, and the inner ropes passing under pulleys V and secured to the middle of the axle, as and for the purpose shown and set forth.

In testimony that we claim the foregoing as our own we have hereunto affixed our signatures in presence of two witnesses.

EDWIN FRENCH.
FRANK PARVIN.

Witnesses:
WILLIAM H. NICHOLS,
W. H. HAMPTON.